US008244282B2

(12) United States Patent
Chavez et al.

(10) Patent No.: US 8,244,282 B2
(45) Date of Patent: Aug. 14, 2012

(54) PERFORMING RECIPIENT BASED ROUTING OF A PHONE CALL

(75) Inventors: Timothy R. Chavez, Austin, TX (US); Jacob D. Eisinger, Austin, TX (US); Michael C. Hollinger, Austin, TX (US); Jennifer E. King, Austin, TX (US); Christina K. Lauridsen, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 12/115,654

(22) Filed: May 6, 2008

(65) Prior Publication Data
US 2009/0280817 A1 Nov. 12, 2009

(51) Int. Cl.
*H04M 3/42* (2006.01)
(52) U.S. Cl. .................................. 455/461; 379/201.01
(58) Field of Classification Search .................. 455/461, 455/417, 465, 426.1, 41.2, 552.1
See application file for complete search history.

(56) References Cited

U.S. PATENT DOCUMENTS

| | | | | |
|---|---|---|---|---|
| 5,592,533 A * | 1/1997 | McHenry et al. | ........... | 455/435.2 |
| 5,845,207 A * | 12/1998 | Amin et al. | ................ | 455/414.1 |
| 6,363,248 B1 * | 3/2002 | Silverman | ..................... | 455/417 |
| 6,404,860 B1 | 6/2002 | Casellini et al. | | |
| 6,421,437 B1 | 7/2002 | Slutsman | | |
| 6,741,688 B1 | 5/2004 | Yau | | |
| 7,260,205 B1 | 8/2007 | Murphy et al. | | |
| 7,319,744 B1 * | 1/2008 | Arnold et al. | ............ | 379/201.03 |
| 2003/0033394 A1 | 2/2003 | Stine | | |
| 2003/0138085 A1 * | 7/2003 | Forman et al. | ........... | 379/142.01 |
| 2004/0202300 A1 * | 10/2004 | Cooper et al. | ........... | 379/201.01 |
| 2005/0286705 A1 | 12/2005 | Contolini et al. | | |
| 2006/0077956 A1 | 4/2006 | Saksena et al. | | |
| 2006/0077957 A1 * | 4/2006 | Reddy et al. | ................... | 370/352 |
| 2006/0093118 A1 | 5/2006 | Agrawal et al. | | |
| 2006/0135138 A1 | 6/2006 | Lazaridis et al. | | |
| 2007/0232277 A1 | 10/2007 | Spalink et al. | | |
| 2007/0287438 A1 * | 12/2007 | Hansen et al. | ................ | 455/417 |
| 2008/0004009 A1 * | 1/2008 | Caldwell et al. | .............. | 455/434 |
| 2008/0112554 A1 * | 5/2008 | Arnold et al. | ............ | 379/201.03 |
| 2008/0130554 A1 | 6/2008 | Gisby et al. | | |
| 2009/0023427 A1 | 1/2009 | Kahn et al. | | |
| 2009/0086947 A1 * | 4/2009 | Vendrow | .................. | 379/201.12 |

OTHER PUBLICATIONS

Chavez et al.—U.S. Appl. No. 12/115,649, Non-Final Office Action dated Aug. 9, 2011.

(Continued)

*Primary Examiner* — Kamran Afshar
*Assistant Examiner* — Joseph Dean, Jr.
(74) *Attorney, Agent, or Firm* — Yudell Isidore Ng Russell PLLC

(57) ABSTRACT

A method, system, and computer program for routing an incoming voice call in real time is presented. A call is received from a caller to an intended receiving wireless telecommunication device. In response to the call failing to connect to the intended receiving wireless telecommunication device, a short range wireless query signal is transmitted to determine if another wireless communication device is within a predefined proximity to the intended receiving wireless telecommunication device. If the intended receiving wireless telecommunication device receives a response from the other wireless telecommunication device indicating that the other wireless telecommunication device is within the predefined proximity to the intended receiving wireless telecommunication device, then the call is rerouted to the other wireless telecommunication device based on preferences internal to the intended receiving wireless device. These preferences may be stored on the intended receiving wireless device or remotely stored on the host carrier network.

17 Claims, 4 Drawing Sheets

OTHER PUBLICATIONS

Chavez et al.—U.S. Appl. No. 12/115,659, Non-Final Office Action dated Aug. 9, 2011.

Chavez et al.—U.S. Appl. No. 12/115,663, Non-Final Office Action dated Aug. 4, 2011.

\* cited by examiner

PERFORMING RECIPIENT BASED ROUTING OF A PHONE CALL

BACKGROUND OF THE INVENTION

1. Technical Field

The present invention relates in general to telecommunications, and in particular to cellular phones. Still more particularly, the present invention relates to performing recipient based routing of a phone call.

2. Description of the Related Art

Cellular (cell) phones have become a ubiquitous aid in allowing a person to be constantly accessible. However, there are times when a person may not desire, or may be unable, to take an incoming call.

SUMMARY OF THE INVENTION

A method, system, and computer program for routing an incoming voice call in real time is presented. A call is received from a caller to an intended receiving wireless telecommunication device. In response to the call failing to connect to the intended receiving wireless telecommunication device, a short range wireless query signal is transmitted to determine if another wireless communication device is within a predefined proximity to the intended receiving wireless telecommunication device. If the intended receiving wireless telecommunication device receives a response from the other wireless telecommunication device indicating that the other wireless telecommunication device is within the predefined proximity to the intended receiving wireless telecommunication device, then the call is rerouted to the other wireless telecommunication device based on preferences internal to the intended receiving wireless device. These preferences may be stored on the intended receiving wireless device or remotely stored on the host carrier network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
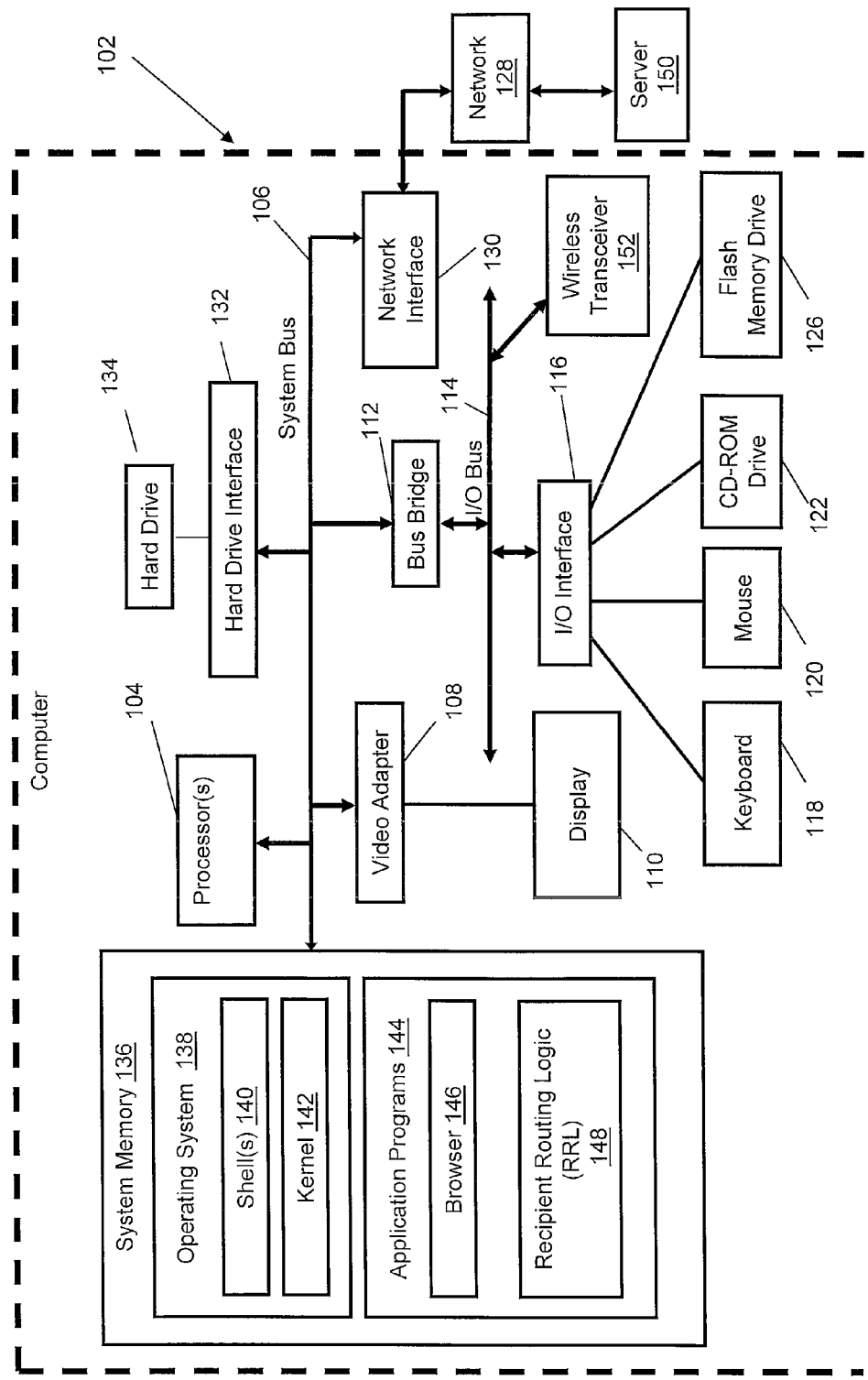
FIG. 1 is a block diagram of a data processing system in which the present invention may be implemented.

With reference now to FIG. 1, there is depicted a block diagram of an exemplary computer 102 in which the present invention may be implemented. Computer 102 includes one or more processors 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150.

Application programs 144 in computer 102's system memory (as well as software deploying server 150's system memory) also include a Recipient Routing Logic (RRL) 148. RRL 148 includes code for implementing the processes described in FIGS. 2-3. In one embodiment, computer 102 is able to download RRL 148 from software deploying server 150, including in an "on demand" basis, as described in greater detail below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of RRL 148), thus freeing computer 102 from having to use its own internal computing resources to execute RRL 148.

Note also the architecture shown in FIG. 1 for computer 102 may be substantially implemented in Caller Telecommunication Device (CTD) 202, Common Host Carrier 204, Intended Recipient Wireless Telecommunication Device (IRWTD) 206, and Proximate Telecommunication Devices (PTDs) 208*a-n* shown below in FIG. 2.

Figure 2:
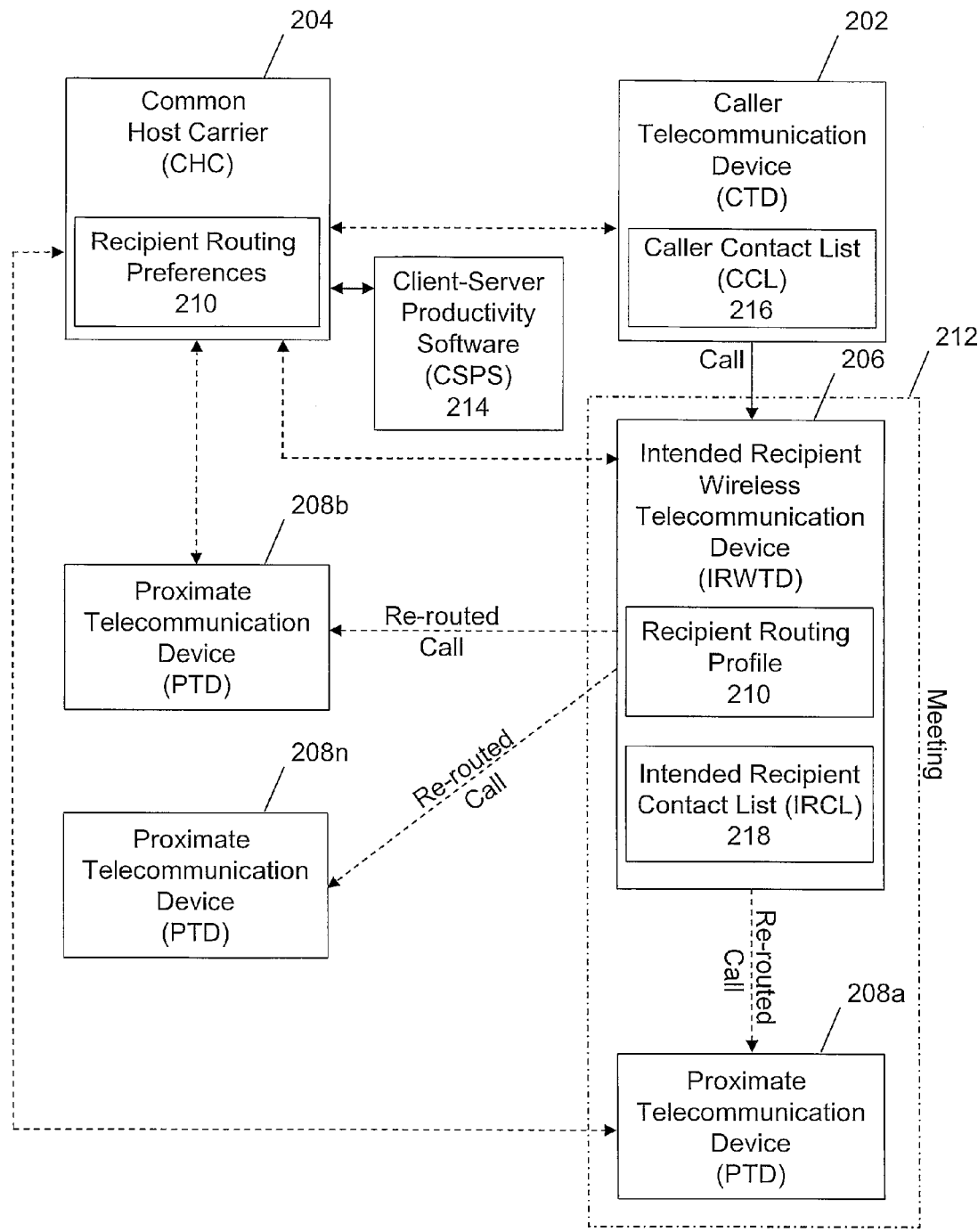
FIG. 2 is a block diagram of an exemplary system for performing recipient based routing of a phone call.

With reference now to FIG. 2, a block diagram of the routing system used in an exemplary embodiment of the present invention is presented. A Caller Telecommunication Device (CTD) 202 (e.g., a cell phone, a Plain Old Telephone System (POTS) land line, a cell-capable Personal Assistant Device (PDA), etc.) connected to Common Host Carrier (CHC) 204 initiates a communication to an Intended Recipient Wireless Telecommunication Device (IRWTD) 206. The communication may be a voice call, voice message, or a notification message (e.g., email, SMS message, user MMS message, etc.) composed by the user of CTD 202, or translated via speech-to-text software of CHC 204. CHC 204 is a remote service host such as a cellular service provider that is remotely connected to both CTD 202 and IRWTD 206. If IRWTD 206's ringer is "on", and thus the called user is available, the communication will be connected. As described below, however, in the present invention, several options are available for performing recipient based routing of an incoming communication to a Proximate Telecommunication Devices (PTDs) 208*a-n* when IRWTD 206 is otherwise unavailable if IRWTD 206 has a configured Recipient Routing Profile (RRP) 210 stored locally on the device, or alternatively stored on CHC 204.

When the user of IRWTD 206 is unavailable, a first routing option is for the caller who is using CTD 202 to leave a voicemail message, which will be retrievable when IRWTD 206 is either turned back on or the user becomes available. However, if IRWTD 206 has a configured Recipient Routing Profile (RRP) 210 the communication from CTD 202 may be routed to another PTD 208*a-n* (where "n" is an integer).

Recipient Routing Profile (RRP) 210, is comprised of a series of user modifiable routing preferences set by the user of IRWTD 206 and stored on either IRWTD 206 itself, or alternatively on CHC 204. Some examples of such preferences stored on RRP 210 include "Route-to" routing lists, "Do not Route-to" routing lists, "Meeting" routing lists, proximate routing preferences, common contact routing preferences, and tiers-of-service routing preferences.

When CTD 202 initiates a call with IRWTD 206 and IRWTD 206 is unavailable, software internal to CTD 202 checks for the presence of a RRP 210 for IRWTD 206 first on the device IRWTD 206 itself, and secondly on CHC 204. If no RRP 210 is available the call will route to a voicemail which will be retrievable when IRWTD 206 is either turned back on or the user becomes available. When RRP 210 for IRWTD 206 is configured for proximate device routing, CTD 202 reads the RRP 210 configuration options, and instructs IRWTD 206 to scan for other devices in physically proximate short range. This is accomplished using software internal to IRWTD 206 (e.g., RRL 148) that autonomously utilizes a hardware based wireless technology internal to IRWTD 206, such as a short-range radio or infrared signal, to determine if any PTDs 208*a-n* are within a physically proximate short range of IRWTD 206, and are available to receive the incoming voice call. Optionally an unlicensed secure wireless personal area network (PAN), may be implemented for wireless transmission. The short range of the device is the maximum range of communication available between IRWTD 206 and one or more of the PTDs 208*a-n* without the use of a network carrier service (e.g., a cell phone carrier service), and is further determined by the internal wireless technology common to IRWTD 206 and PTD 208.

RRP 210 determines the appropriate PTD 208 to route the incoming call to based on a priority of routing preferences stored within the RRP 210. Any PTDs 208*a-n* on the "Do not Route-to" routing list of RRP 210 are automatically excluded as a potential recipient for the incoming call. The primary routing method will direct the incoming call to the first available PTD 208*a-n* contained on the "Route-to" list of RRP 210. When a "Route-to" list is unavailable and RRP 210 of IRWTD 206 is configured for proximate device routing the RRP 210 of IRWTD 206 will automatically re-route to the first PTD 208 within short range proximity that meets the requisite conditions of RRP 210 (e.g., strong battery, strong signal strength with the IRWTD 206, authorized to take the call from "Caller A," etc.).

When a "Route-to" list is unavailable and IRWTD 206 is not configured for proximate device routing the RRP 210 for IRWTD 206 will determine if IRWTD 206 is currently in a Meeting 212 where PTD(s) 208 may be available to receive the incoming call. RRP 210 can interface with Client-Server Productivity Software (CSPS) 214 to determine attendees of a meeting. CSPS 214 is an application where users can set up conference times at the same physical location or from remote locations. CSPS 214 also allows users to view other attendees of Meeting 212 and parameters of the meeting such as the time of the meeting, location of the meeting, etc. Some common examples of Client-Server Productivity Software are Lotus Notes® and Microsoft Outlook®. When RRP 210 is configured for routing to PTDs 208*a-n* in a same Meeting 212 as IRWTD 206, CSPS 214 will automatically determine the attendees of Meeting 212 and will transmit this information by a connection to CHC 204 to IRWTD 206, allowing IRWTD 206 to automatically re-route the incoming call to the first available PTD 208 in the meeting.

When RRP 210 has not been configured to routing to attendees of Meeting 212 or when no attendees of Meeting 212 are available, RRP 206 will initiate a comparison of the Caller Contact List (CCL) 216 and the Intended Recipient Contact List (IRCL) 218. CCL 216 and IRCL 218 may be stored locally on CTD 202 and IRWTD 206, respectively, or stored remotely on CHC 204. RRP 210 when properly configured to do so, will instruct IRWTD 206 to automatically re-route the incoming voice call to the first PTD 208 common to both CCL 216 and IRCL 218. If no contacts are common to both CCL 216 and IRCL 218, RRP 210 will re-route the incoming call to the first PTD 208 within short range proximity to IRWTD 206 based on CHC 204 tiers of service. That is, IRWTD 206 will re-reroute the incoming phone call to a PTD 208 connected to the same CHC 204 as IRWTD 206. If no PTD 208 connected to the same CHC 204 as IRWTD 206 is available the user of CTD 202 may be routed to a voicemail which will be retrievable when IRWTD 206 is available, or to any available PTD 208 within short range proximity, based on preferences of RRP 210.

Figure 3A:
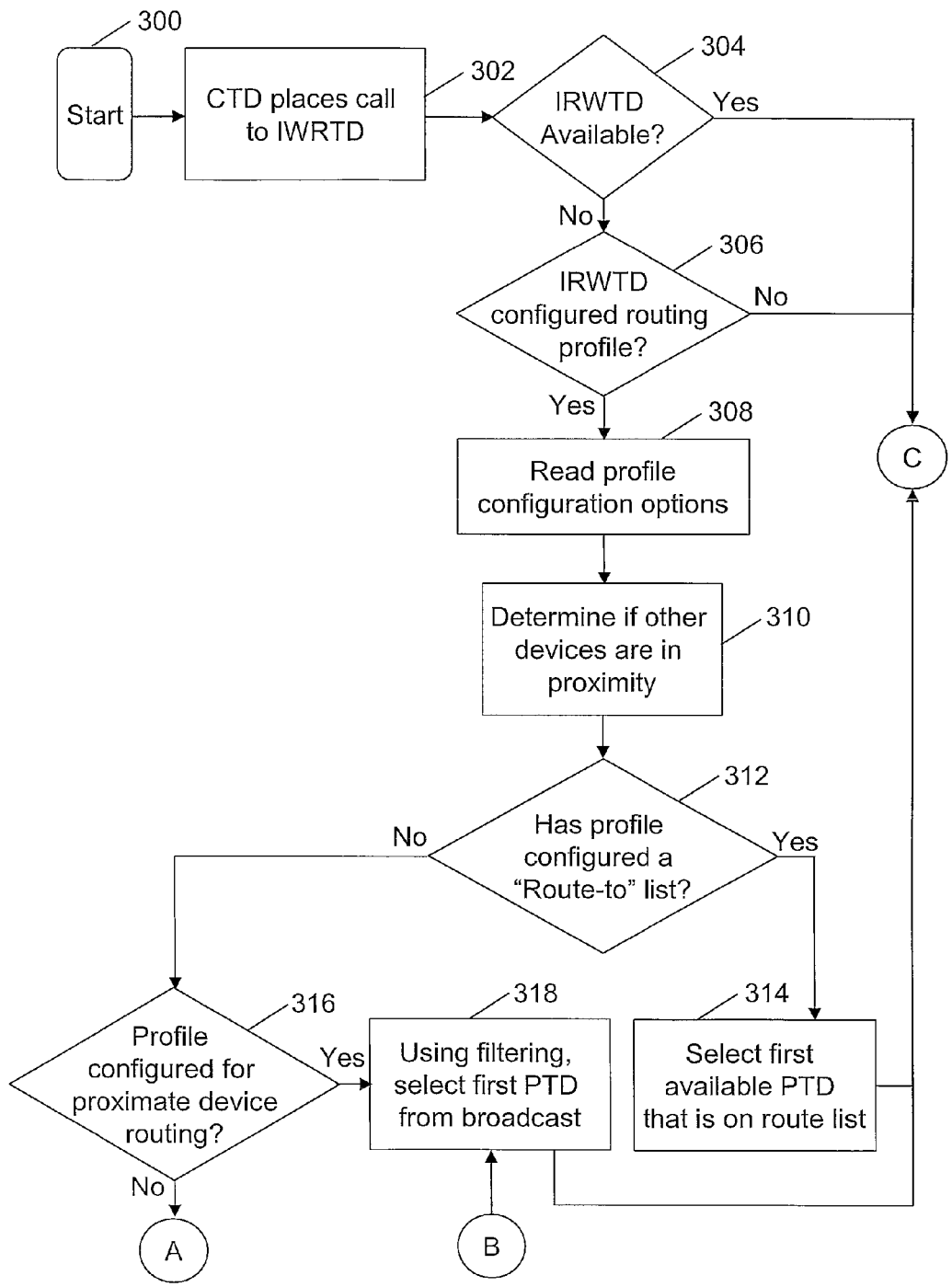
FIGS. 3A-3B are a high-level logical flowchart of an exemplary set of steps performed while performing recipient based re-route of a phone call.
Figure 3B:
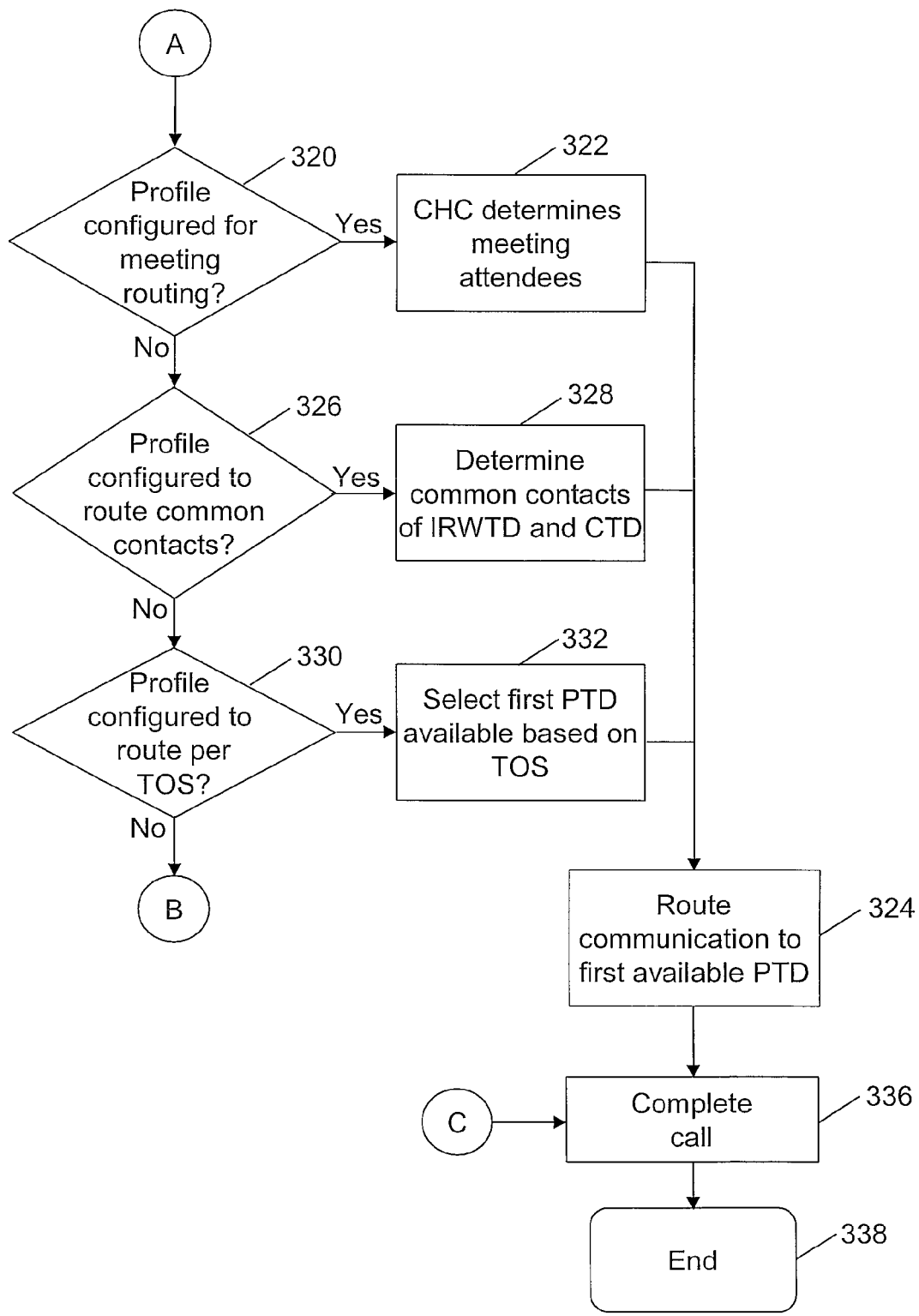

With reference now to FIGS. 3A-3B, a high-level logical flowchart of an exemplary set of steps performed to re-route communication, in this case a phone call, is presented. After initiator block 300, a voice call is initiated from a Caller Telecommunication Device (CTD) to an Intended Recipient Wireless Telecommunication Device (IRWTD) (block 302). It is then determined by the Host Carrier if the IRWTD is available (block 304). If IRWTD is available, the call is completed (block 336) and the process ends at terminator block 338. When IRWTD is not available, the CTD determined if The recipient routing profile of IRWTD have been established (block 306). If a RRP for IRWTD has been established the RRP is read by CTD to identify IRWTD's preferences for incoming call re-routing desired, assuming that rerouting and/or processing of the voice call is desired and appropriate (block 308).

When IRWTD has a configured a RRP, stored either on the IRWTD itself or on a Common Host Carrier (CHC), IRWTD then determines if any preferred Proximate Telecommunication Devices (PTDs) are within a predefined proximity of the IRWTD (block 310). The term "predefined proximity" is defined as the distance between the IRWTD and a PTD in which local wireless communication is possible without the use of an intervening network or carrier. That is, the term "predefined proximity" is defined as a distance within which the IRWTD and PTD can directly communicate using local electromagnetic signals (including radio, infrared, secure PAN, etc.) to directly communicate between one another.

The CTD will next determine if RRP contains a "Route-to" list for IRWTD. If RRP does contain a "Route-to" list, software internal to IRWTD will select the first available PTD on the "Route-to" list (block 314). The call is then completed (block 336) and the process ends at terminator block 338.

When RRP does not contain a "Route-to" list for IRWTD software internal to CTD will determine if RRP has a configured profile for proximate device routing (block 316). If RRP specifies a proximate device routing profile, IRWTD will select the first available PTD returned from the proximity broadcast, performed in query block 310, and will apply any rerouting filtering to the resulting PTDs based on criteria such as: strong battery, strong signal strength with the IRWTD 206, etc (block 318). The call is then completed (block 336) and the process ends at terminator block 338.

When RRP does not contain a profile configured for proximate device routing, software internal to CTD will determine if RRP has a configured profile for meeting routing, and if IRWTD is in a meeting at the time of the initial phone call (block 320). If these conditions are met, IRWTD will initiate a request with Common Host Carrier (CHC), to utilize a connection with Client-Server Productivity Software (CSPS) to determine any other available PTDs of the same meeting that IRWTD is attending (block 322). If a PTD is available in the same meeting IRWTD is currently attending, IRWTD will route the communication to the first available PTD (block 324). The call is then completed (block 336) and the process ends at terminator block 338.

When RRP does not contain a profile configured for meeting routing, software internal to CTD will determine if RRP has a configured profile for common contact routing, (block 326). If this condition is met, IRWTD will initiate a request with Common Host Carrier (CHC), to determine any available PTDs that are common contacts of both CTD and IRWTD (block 328). If a PTD common to both CTD and IRWTD contact lists exists, IRWTD will route the communication to the first available PTD (block 324). The call is then completed (block 336) and the process ends at terminator block 338.

When RRP does not contain a profile configured for common contact routing, software internal to CTD will determine if RRP has a configured profile for tiers of service routing, (block 330). If this condition is met, IRWTD will select a first PTD within short range proximity, based on tiers of service routing preferences of RRP (block 332). IRWTD will route the communication to the first available PTD (block 324). The call is then completed (block 336) and the process ends at terminator block 338.

When all previous methods of routing have failed, then the process loops back to query block 318 in an iterative manner to determine the first PTD available based on criteria such as: strong battery, strong signal strength with the IRWTD 206, etc. It is important to note, at this time, the PTD selected may not be in the same Host Carrier network as CTD and IRWTD. Alternatively, if this call route attempt can not to be performed (i.e., no PTDs are available), then a voicemail is left with the IRWTD. The call or voicemail is then completed (block 336) and the process ends at terminator block 338.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of data storage media, which include, without limitation, non-writable storage media (e.g. CD-ROM), and writable storage media (e.g. network attached storages, hard disk drive, read/write CD-ROM, optical media). It should be understood, therefore, that such data storage media, when storing computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of routing an incoming phone call, the method comprising:
   - a computer registering that an intended receiving telecommunication device is receiving a call from a caller telecommunication device;
   - the computer determining that a user of the intended receiving telecommunication device is unavailable to answer the call; and
   - in response to the computer determining that a user of the intended receiving telecommunication device is unavailable to answer the received call, the computer triggering the intended receiving telecommunication device to transmit a short range wireless query signal;
   - the computer determining, by one or more responses to the query signal, that one or more alternate telecommunication devices are within a predefined proximity to the intended receiving telecommunication device;
   - the computer ranking the one or more alternate telecommunication devices according to signal strength between the one or more alternate telecommunication devices and the intended receiving telecommunication device;
   - the computer determining that one of the one or more alternate telecommunication devices has a highest ranking of signal strength between the one or more alternate telecommunication devices and the intended receiving telecommunication device; and in response to the computer determining that one of the one or more alternate telecommunication devices has the highest ranking of signal strength, the computer rerouting the call to the one of the one or more alternate telecommunication devices.

2. The method of claim 1, wherein the rerouting is based on a profile for the user of the intended receiving telecommunication device, wherein the profile of the user of the intended receiving telecommunication device indicates that the user of the intended receiving telecommunication device is attending a meeting, and wherein the profile identifies a user of the one of the one or more alternate telecommunication devices as a co-attendee of the meeting.

3. The method of claim 2, further comprising:
the computer determining if the intended receiving telecommunication device is configured to prevent rerouting of incoming calls; and
the computer, in response to determining that the intended receiving telecommunication device is configured to prevent rerouting incoming calls, blocking an attempt to reroute the call to the one of the one or more alternate telecommunication devices.

4. The method of claim 1, wherein:
the rerouting is based on a profile for the user of the intended receiving telecommunication device;
the intended receiving telecommunication device has a first contact list;
the one of the one or more alternate telecommunication devices has a second contact list;
the profile identifies a receiving party based on a common entry in the first contact list and the second contact list; and
the receiving party is a user of the one of the one or more alternate telecommunication devices.

5. The method of claim 1, wherein:
the rerouting is based on a profile for the intended receiving telecommunication device; and
the profile identifies a common wireless carrier service for the intended receiving telecommunication device and the one or more alternate telecommunication devices.

6. The method of claim 5, further comprising:
the computer, in response to a determination that none of the one or more alternative telecommunication devices uses the common wireless carrier service, rerouting a second call to a second alternate telecommunication device that has a different wireless carrier service than the intended receiving telecommunication device.

7. A computer system comprising:
one or more processors;
one or more computer-readable memories; and
one or more computer-readable tangible storage devices;
program instructions, stored on at least one of the one or more computer-readable tangible storage devices for execution by at least one of the one or more processors via at least one of the one or more memories, to register that an intended receiving telecommunication device is receiving a call from a caller telecommunication device;
program instructions, stored on at least one of the one or more computer-readable tangible storage devices for execution by at least one of the one or more processors via at least one of the one or more memories, to determine that a user of the intended receiving telecommunication device is unavailable to answer the call; and
program instructions, stored on at least one of the one or more computer-readable tangible storage devices for execution by at least one of the one or more processors via at least one of the one or more memories to, in response to determining that the user of the intended receiving telecommunication device is unavailable to answer the received call, trigger the intended receiving telecommunication device to transmit a short range wireless query signal;
program instructions, stored on at least one of the one or more computer-readable tangible storage devices for execution by at least one of the one or more processors via at least one of the one or more memories, to determine, by one or more responses to the query signal, that one or more alternate telecommunication devices are within a predefined proximity to the intended receiving telecommunication device;
program instructions, stored on at least one of the one or more computer-readable tangible storage devices for execution by at least one of the one or more processors via at least one of the one or more memories, to rank the one or more alternate telecommunication devices according to signal strength between the one or more alternate telecommunication devices and the intended receiving telecommunication device;
program instructions, stored on at least one of the one or more computer-readable tangible storage devices for execution by at least one of the one or more processors via at least one of the one or more memories, to determine that one of the one or more alternate telecommunication devices has a highest ranking of signal strength between the one or more alternate telecommunication devices and the intended receiving telecommunication device; and
program instructions, stored on at least one of the one or more computer-readable tangible storage devices for execution by at least one of the one or more processors via at least one of the one or more memories to, in response to determining that the one of the one or more alternate telecommunication devices has the highest ranking of signal strength, reroute the call to the one of the one or more alternate telecommunication devices.

8. The computer system of claim 7, wherein:
the program instructions to reroute the call to the one of the one or more alternate telecommunication devices reroute the call based on a profile for the user of the intended receiving telecommunication device;
the profile of the user of the intended receiving telecommunication device indicates that the user of the intended receiving telecommunication device is attending a meeting; and
the profile identifies a user of the one of the one or more alternate telecommunication devices as a co-attendee of the meeting.

9. The computer system of claim 8, further comprising:
program instructions, stored on at least one of the one or more computer-readable tangible storage devices for execution by at least one of the one or more of the processors via at least one of the one or more memories, to determine if the intended receiving telecommunication device is configured to prevent rerouting of incoming calls; and
program instructions, stored on at least one of the one or more computer-readable tangible storage devices for execution by at least one of the one or more of the processors via at least one of the one or more memories, to, in response to determining that the intended receiving telecommunication device is configured to prevent rerouting of incoming calls, block an attempt to reroute the call to the one of the one or more alternate telecommunication devices.

10. The computer system of claim 7, wherein:
the program instructions to reroute the call to the one of the one or more alternate telecommunication devices reroute the call based on a profile for the user of the intended receiving telecommunication device;
the intended receiving telecommunication device has a first contact list;
the one of the one or more alternate telecommunication devices has a second contact list;
the profile identifies a receiving party based on a common entry in the first contact list and the second contact list; and
the receiving party is a user of the one of the one or more alternate telecommunication devices.

11. The computer system of claim 7, wherein:
the program instructions to reroute the call to the one of the one or more alternate telecommunication devices reroute the call based on a profile for the intended receiving telecommunication device; and
the profile identifies a common wireless carrier service for the intended receiving telecommunication device and the one or more alternate telecommunication devices.

12. The computer system of claim 11, further comprising:
program instructions, stored on at least one of the one or more computer-readable tangible storage devices for execution by at least one of the one or more of the processors via at least one of the one or more memories, to, in response to a determination that none of the one or more alternative telecommunication devices use the common wireless carrier service, reroute the call to a second alternate telecommunication device that has a different wireless carrier service than the intended receiving telecommunication device.

13. A computer program product, comprising:
one or more computer-readable tangible storage devices;
program instructions, stored on at least one of the one or more computer-readable tangible storage devices, to register that an intended receiving telecommunication device is receiving a call from a caller telecommunication device;
program instructions, stored on at least one of the one or more computer-readable tangible storage devices, to determine that a user of the intended receiving telecommunication device is unavailable to answer the call; and
program instructions, stored on at least one of the one or more computer-readable tangible storage devices, to, in response to determining that the user for the intended receiving telecommunication device is unavailable to answer the received call, trigger the intended receiving wireless telecommunication device to transmit a short range wireless query signal;
program instructions, stored on at least one of the one or more computer-readable tangible storage devices, to determine, by one or more responses to the query signal, that one or more alternate telecommunication devices are within a predefined proximity to the intended receiving telecommunication device;
program instructions, stored on at least one of the one or more computer-readable tangible storage devices, to rank the one or more alternate telecommunication devices according to signal strength between the one or more alternate telecommunication devices and the intended receiving telecommunication device;
program instructions, stored on at least one of the one or more computer-readable tangible storage devices, to determine that one of the one or more alternate telecommunication devices has a highest ranking of signal strength between the one or more alternate telecommunication devices and the intended receiving telecommunication device; and
program instructions, stored on at least one of the one or more computer-readable tangible storage devices to, in response to determining that the one of the one or more alternate telecommunication devices has the highest ranking of signal strength, reroute the call to the one of the one or more alternate telecommunication devices.

14. The computer program product of claim 13, wherein:
the program instructions to reroute the call to the one of the one or more alternate telecommunication devices reroute the call based on a profile for the user of the intended receiving telecommunication device;
the profile of the user of the intended receiving telecommunication device indicates that the user of the intended receiving telecommunication device is attending a meeting; and
the profile identifies a user of the one of the one or more alternate telecommunication devices as a co-attendee of the meeting.

15. The computer program product of claim 14, further comprising:
program instructions, stored on at least one of the one or more computer-readable tangible storage devices, to determine if the intended receiving telecommunication device is configured to prevent rerouting of incoming calls; and
program instructions, stored on at least one of the one or more computer-readable tangible storage devices, to, in response to determining that the intended receiving telecommunication device is configured to prevent rerouting of incoming calls, block an attempt to reroute the call to the one of the one or more alternate telecommunication devices.

16. The computer program product of claim 13, wherein:
the program instructions to reroute the call to the one of the one or more alternate telecommunication devices reroute the call based on a profile for the user of the intended receiving telecommunication device;
the intended receiving telecommunication device has a first contact list;
the one of the one or more alternate telecommunication devices has a second contact list;
the profile identifies a receiving party based on a common entry in the first contact list and the second contact list; and
the receiving party is a user of the one of the one or more alternate telecommunication devices.

17. The computer program product of claim 13, wherein:
the program instructions to reroute the call to the one of the one or more alternate telecommunication device reroute the call based on a profile for the intended receiving telecommunication device; and
the profile identifies a common wireless carrier service for the intended receiving telecommunication device and the one or more alternate telecommunication devices.

* * * * *